United States Patent
Chou et al.

(10) Patent No.: US 8,081,221 B2
(45) Date of Patent: Dec. 20, 2011

(54) DIGITAL IMAGE PROCESSING METHOD FOR CORRECTING SHAKING BLUR

(75) Inventors: Hong-Long Chou, Taipei (TW); Chih-Yuan Yang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 438 days.

(21) Appl. No.: 12/425,441

(22) Filed: Apr. 17, 2009

(65) Prior Publication Data

US 2009/0268041 A1    Oct. 29, 2009

(30) Foreign Application Priority Data

Apr. 25, 2008 (TW) .............................. 97115473 A

(51) Int. Cl.
*H04N 5/228* (2006.01)

(52) U.S. Cl. ............. 348/208.12; 348/208.6; 348/208.4; 348/208.99

(58) Field of Classification Search ........................ None
See application file for complete search history.

(56) References Cited

U.S. PATENT DOCUMENTS

2006/0158523 A1*  7/2006  Estevez et al. ............. 348/208.4
2007/0223831 A1*  9/2007  Mei et al. ..................... 382/260

* cited by examiner

*Primary Examiner* — David Ometz
*Assistant Examiner* — Angel L Garces-Rivera
(74) *Attorney, Agent, or Firm* — Stevens & Showalter LLP

(57) ABSTRACT

A digital image processing method for correcting a shaking blur corrects a blurred image caused by a shake when a user shoots an image with a digital camera, which includes the following steps obtaining a safe shutter time of the digital camera; performing an exposure adjustment procedure, for adjusting an aperture and a ISO speed of the digital camera respectively, and obtaining a shutter time of the digital camera after being adjusted; performing a shooting procedure; shooting a plurality of digital images, if the shutter time of the digital camera is greater than the safe shutter time; and then performing an image compensation procedure according to the digital images, to align the same image object in the digital images and then to overlay each pixel of the digital images one by one, thereby outputting an output image.

4 Claims, 10 Drawing Sheets

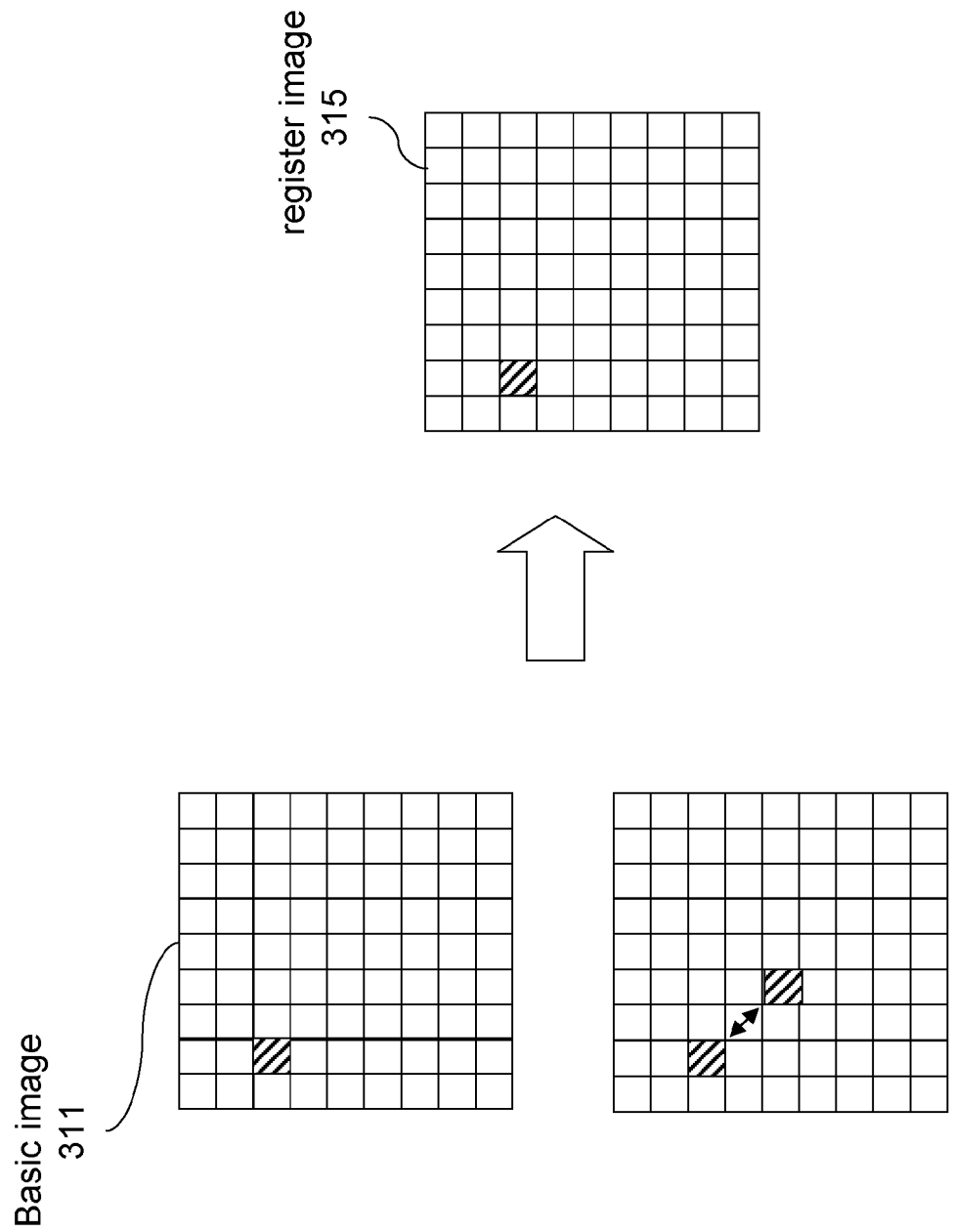

DIGITAL IMAGE PROCESSING METHOD FOR CORRECTING SHAKING BLUR

CROSS-REFERENCE TO RELATED APPLICATIONS

This non-provisional application claims priority under 35 U.S.C. §119(a) on Patent Application No(s). 097115473 filed in Taiwan, R.O.C. on Apr. 25, 2008 the entire contents of which are hereby incorporated by reference.

BACKGROUND OF THE INVENTION

1. Field of the Invention

The present invention relates to a digital image processing method, and more particularly to a digital image processing method for correcting a shaking blur.

2. Related Art

Nowadays, as the digital camera has been rapidly developed, many people select to keep the memorable moment by photography. However, regardless of a film camera or a digital camera, usually, if a user does not hold the camera steadily when taking a picture, a blurred image may be generated. As long as the camera is simply held with hands, more or less the shaking problem exists. Actually, the merely difference lies in that, the stabilization degree for holding the camera varies depending upon each user, and every one shifts his/her hand involuntarily at the moment of pressing the shutter. Therefore, in order to prevent the blurred image resulted from the shake during shooting, the digital camera manufacturers try to prevent the shake through hardware configuration or to correct the blurred digital images through software.

Therefore, each digital camera manufacturer adds particular anti-shake mechanisms in the products. The anti-shake mechanism detects and restrains the image blur phenomenon resulted from the hand shake during the shooting process, and the anti-shake technique is mainly achieved through hardware or software.

As for the hardware manner, a photosensitive element and a mechanical anti-shake means are generally used. The anti-shake means through a photosensitive element is helpful for improving a ISO (International Standards Organization, hereafter referred to as ISO). Basically, the improving of the ISO speed only makes the shutter finish the shooting motion before sensing the hand shake, but more noises are further resulted, as the ISO speed is improved. In the mechanical anti-shake means, a movement detecting element is disposed in the digital camera. When the digital camera detects the hand shake, the digital camera shifts a lens towards a direction opposite to the direction of the hand shake, thereby compensating the image blurring resulted from the shift of the hand. In another anti-shake means, an aperture is enlarged, which lets more light enter therein through the aperture, thereby shortening a shutter time. However, the size of the aperture depends on the combined structure of the lens group. Generally, the lens with a large aperture has higher cost and larger volume, so it is not easily disposed in the consumer digital camera.

SUMMARY OF THE INVENTION

In view of the above problems, the present invention is mainly directed to a digital image processing method for correcting a shaking blur, which is applied to correct an image blur caused by the hand shake during shooting with a digital camera.

The present invention provides a digital image processing method for correcting a shaking blur, which includes the following steps: obtaining a safe shutter time of the digital camera; performing an exposure adjustment procedure, for adjusting an aperture value and a ISO speed of the digital camera respectively; obtaining a shutter time of the digital camera after being adjusted; performing a shooting procedure; shooting a plurality of digital images, if the shutter time of the digital camera is greater than the safe shutter time; and performing an image compensation procedure according to the digital images to align each corresponding pixel of the same image object in the digital images and to overlay each pixel one by one, thereby generating an output image.

The present invention provides a method for preventing the blurred image caused by the shake during shooting. In the present invention, similar areas are retrieved from successive and similar digital images to perform the image compensation on the noisy image, thereby generating a new composite image. The compensation is performed through using similar digital images, so as to improve the clearness and cleanness of the digital image.

BRIEF DESCRIPTION OF THE DRAWINGS

The present invention will become more fully understood from the detailed description given herein below for illustration only, and thus is not limitative of the present invention, and wherein:

FIG. 3b is a schematic view of a selecting window with respect to an image;

FIG. 6 is a schematic view of generating a register image.

DETAILED DESCRIPTION OF THE INVENTION

Figure 1A:
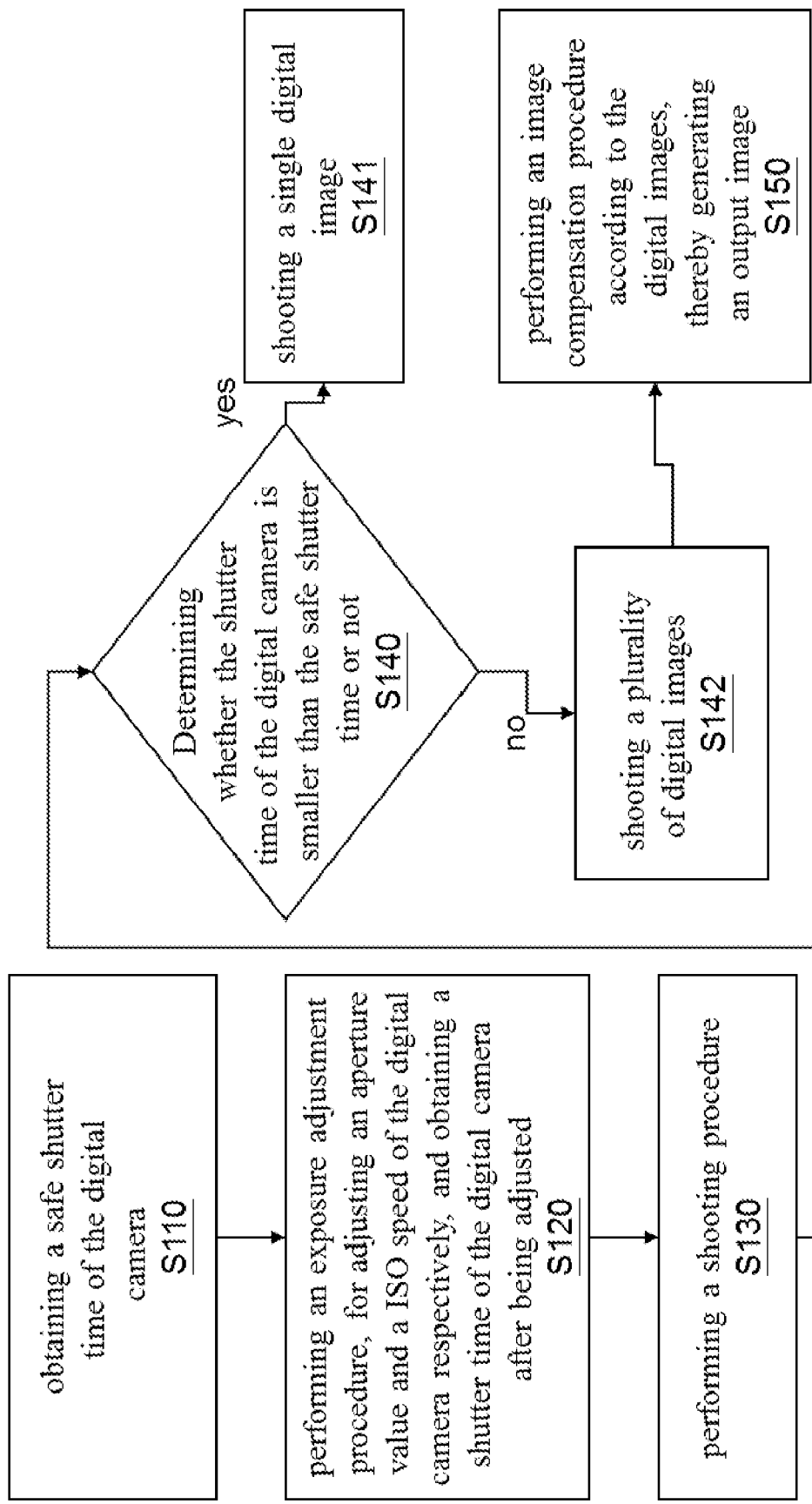
FIG. 1a is a flow chart of an operation of the present invention.

FIG. 1a is a flow chart of an operation of the present invention. Referring to FIG. 1, the digital image processing method for correcting a shake blur includes the following steps: obtaining a safe shutter time of the digital camera (Step S110); performing an exposure adjustment procedure, for adjusting an aperture value and a ISO speed of the digital camera respectively, and obtaining a shutter time of the digital camera after being adjusted (Step S120); performing a shooting procedure (Step S130); determining whether the shutter time of the digital camera is smaller than the safe shutter time or not (Step S140); and if yes, shooting a single digital image (Step S141), otherwise, shooting a plurality of digital images (Step S142); and performing an image compensation procedure according to the digital images, thereby generating an output image (Step S150).

In order to clearly explain the operation in each step, the detailed operations are explained with respect to the individual steps. In Step S110, the safe shutter time of the digital camera is determined according to the ISO speed and the aperture value of the digital camera. The safe shutter time refers to such a shutter time that the possibility of generating the shaking is at the minimum level, if the current shutter time is smaller than such a shutter time. Generally, the safe shutter is set as a reciprocal value of a focal length. For example, if the focal length of the lens is 50 mm, the safe shutter is ($\frac{1}{50}$) s. Therefore, the larger the focal length is, the shorter the safe shutter time of the digital camera is, and vice versa. In addition, the aperture value of the digital camera may also affect the safe shutter time. For the same shutter time, the light entering through the larger aperture is much more than that entering through the smaller aperture, such that the digital camera may finish the photosensitive motion in a shorter shutter time. Therefore, the digital camera may perform the shooting operation by using a shutter with a shorter shutter time.

Figure 1B:
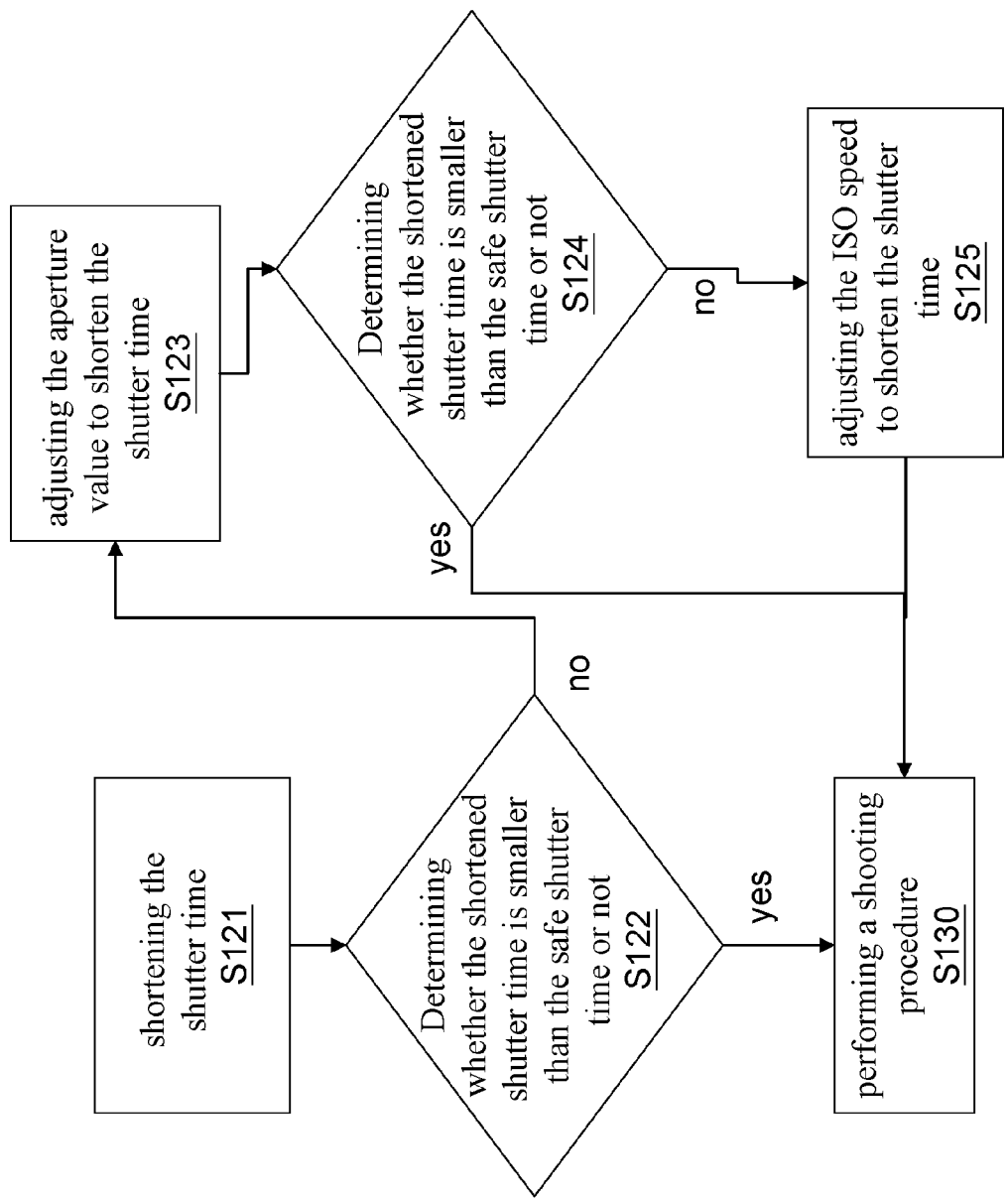
FIG. 1b is a flow chart of an operation of an exposure adjustment procedure.

After obtaining the corresponding safe shutter for such an environment, the digital camera performs an exposure adjustment procedure according to the safe shutter. Referring to FIG. 1b, it is a flow chart of an operation of an exposure adjustment procedure. In this embodiment, the exposure adjustment procedure includes the following steps: shortening the shutter time (Step S121); determining whether the shortened shutter time is smaller than the safe shutter time or not (Step S122), and if yes, performing Step S130, otherwise, adjusting the aperture value to shorten the shutter time (Step S123); then, determining whether the shortened shutter time is smaller than the safe shutter time or not (Step S124); and if the shortened shutter time is still greater than the safe shutter, adjusting the ISO speed to shorten the shutter time (Step S125).

It is determined whether the adjusted shutter time is smaller than the safe shutter or not according to the result of Step S125. If the shooting procedure is performed when the shutter time is smaller than the safe shutter, a single image is shot with the digital camera. If the shooting procedure is performed when the shutter time is greater than the safe shutter, a plurality of digital images is shot (corresponding to Step S142). The number of digital images to be shot is determined according to the current shutter speed of the digital camera. For example, if the shutter time is two times greater than the safe shutter time, at least two digital images are shot. If the shutter time is four times greater than the safe shutter time, at least four digital images are shot in the shutter time. If the shutter time is greater than the safe shutter, the possibility for generating the shaking is increased. In the shutter time of this embodiment, a plurality of digital images is respectively shot, and the image compensation procedure is performed according to the digital images.

It should be particularly noted that, the digital images adopted in this embodiment are raw images (RAW) output by the photosensitive element. The RAW file includes two kinds of information: image pixels and metadata of the image. The metadata is the so-called "data of the data" generated when shooting images with the camera. For example, both the RAW file and JPEG file contain an EXIF metadata, including a camera model, serial number, shutter speed, aperture value, focal length, whether the flash lamp is flashed or not, as well as other information. During shooting, only three types of camera settings may affect the RAW file, namely, aperture value, shutter speed, and ISO speed. Except the above three settings, the photographer may perform various controls during the conversion process. For example, in terms of the white balance, or color, tone, and detail processing (sharp and noise processing), there is quite a large room for making adjustment elastically. What's more, even the exposure compensation may be re-explained.

Figure 1C:
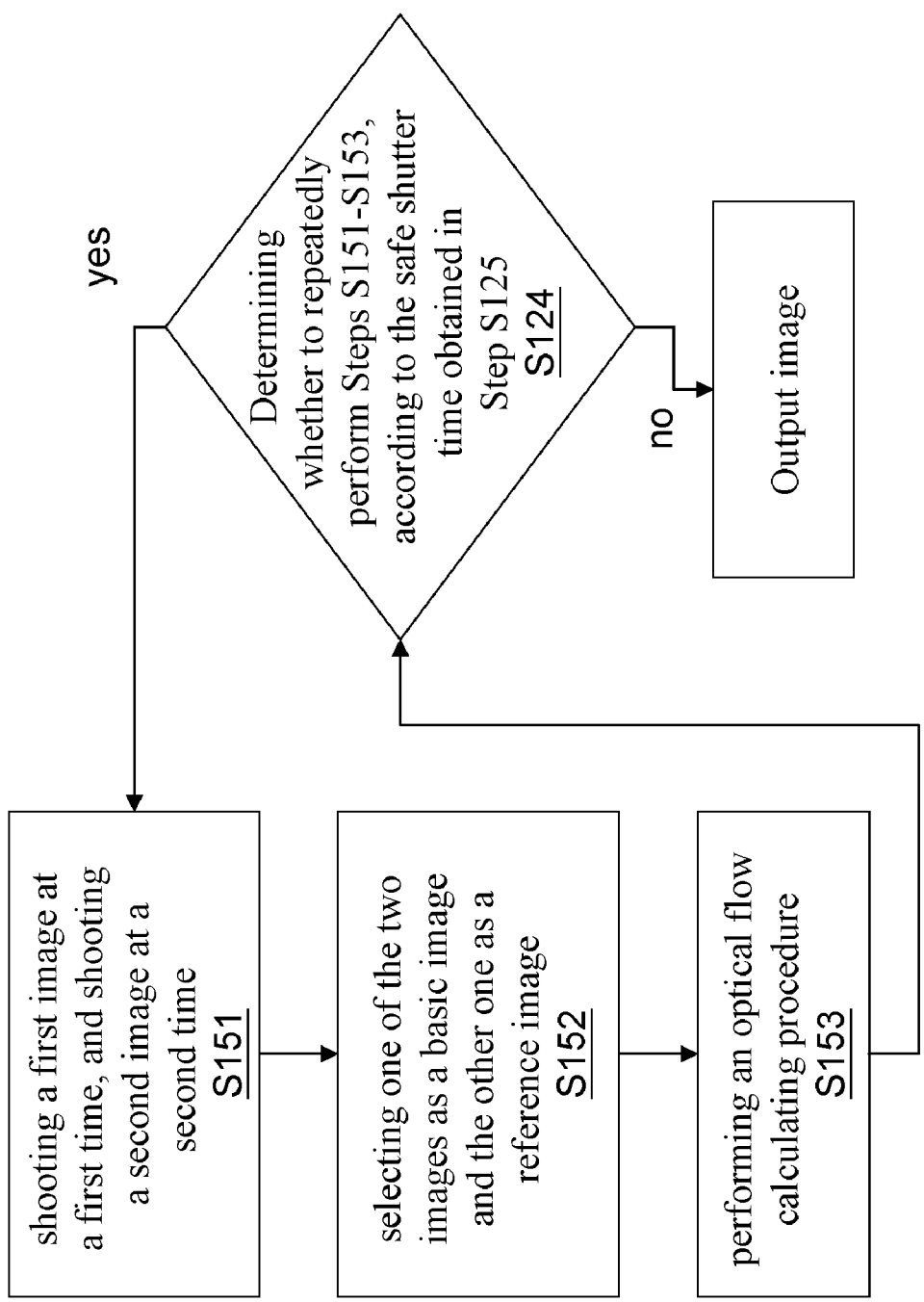
FIG. 1c is a flow chart of an operation of an image compensation procedure.

FIG. 1c is a flow chart of an operation of an image compensation procedure, which includes the following steps: in the safe shutter time obtained in Step S125, shooting a first image at a first time, and shooting a second image at a second time (Step S151); performing a boundary blur detecting means on the first image and the second image respectively, and selecting one of the two images as a basic image and the other one as a reference image (Step S152); performing an optical flow calculating procedure (Step S153), for aligning each pixel position of the same image object in the basic image with that of the reference image, and generating an output image; and determining whether to repeatedly perform Steps S151-S153, according to the safe shutter time obtained in Step S125 (Step S154).

Figure 1D:
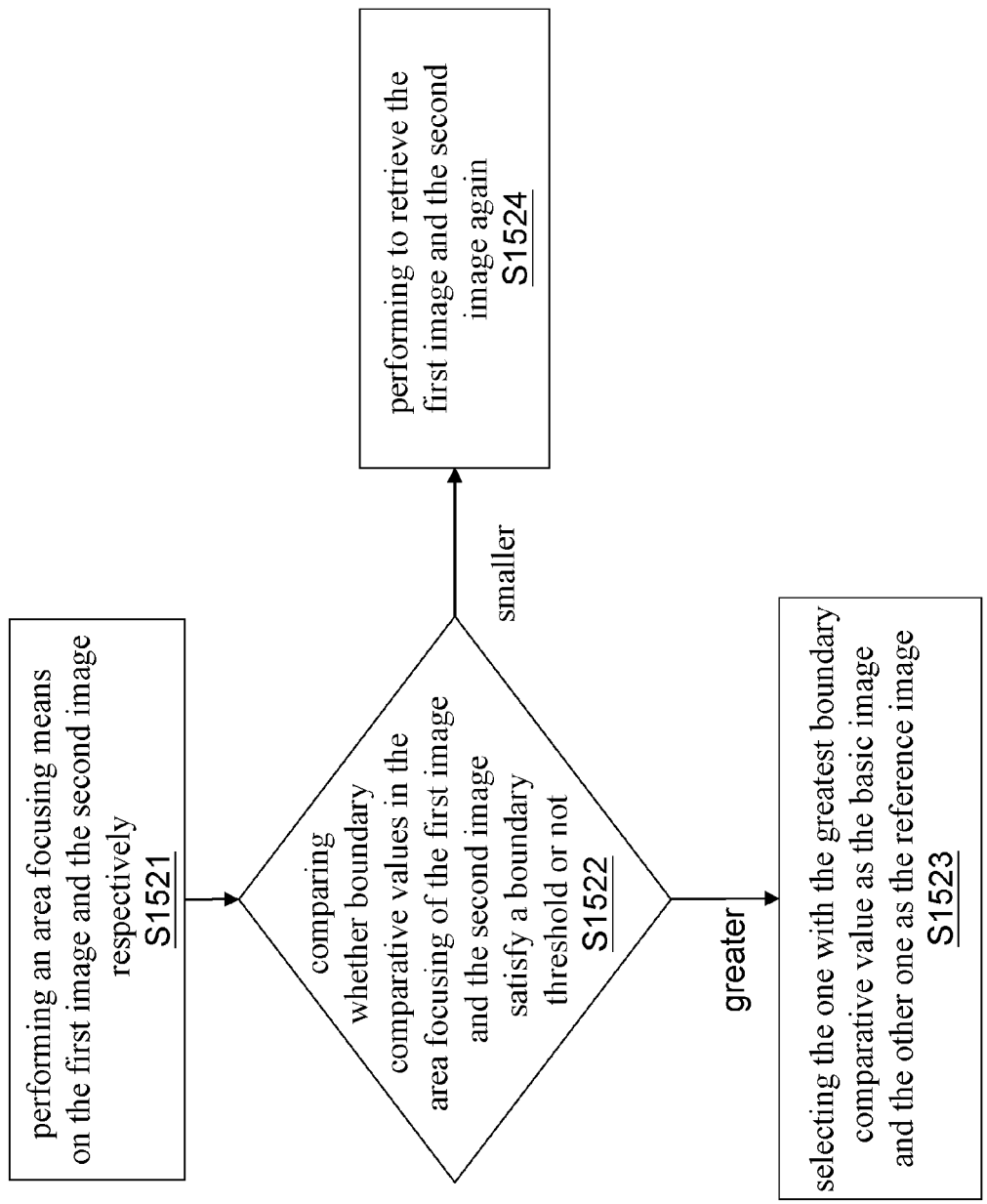
FIG. 1d is a flow chart of an operation of a boundary blur detecting means.

FIG. 1d is a flow chart of an operation of a boundary blur detecting means. The boundary blur detecting means in Step S152 further includes the following steps: performing an area focusing means on the first image and the second image respectively (Step S1521); comparing whether boundary comparative values in the area focusing of the first image and the second image satisfy a boundary threshold or not (Step S1522); if any one of the boundary comparative values of the first image and the second image is greater than the boundary threshold, selecting the one with the greatest boundary comparative value as the basic image and the other one as the reference image (Step S1523); and if both the boundary comparative values of the first image and the second image are smaller than the boundary threshold, performing to retrieve the first image and the second image again (Step S1524).

Figure 1E:
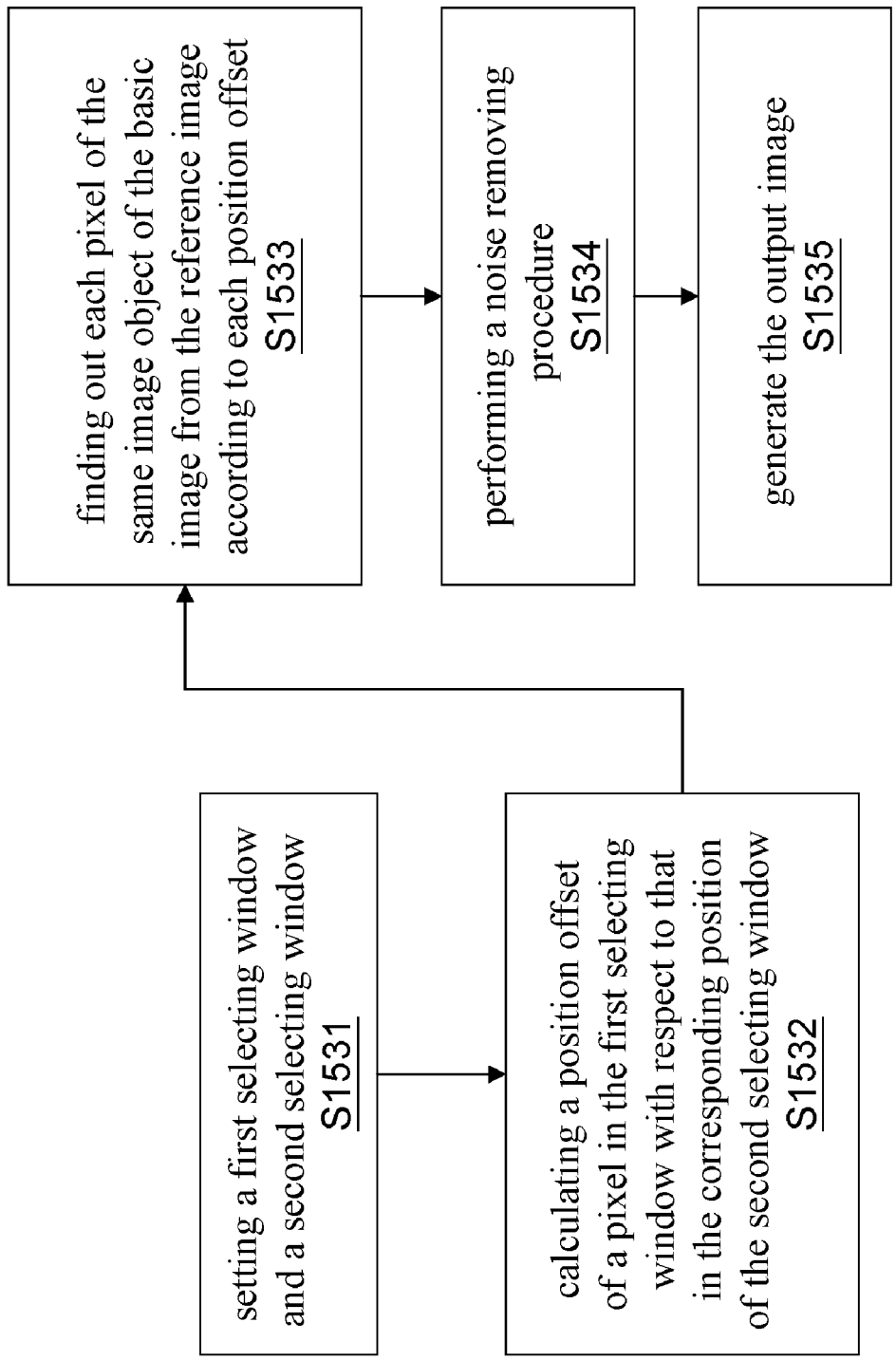
FIG. 1e is a flow chart of an operation of an optical flow calculating procedure.

FIG. 1e is a flow chart of an operation of an optical flow calculating procedure. The optical flow calculating procedure in Step S153 further includes the following steps: setting a first selecting window and a second selecting window (Step S1531), in which the first selecting window is used to select a part of the basic image, the second selecting window is used to select a part of the reference image, and the first selecting window is smaller than the second selecting window; calculating a position offset of a pixel in the first selecting window with respect to that in the corresponding position of the second selecting window (Step S1532); finding out each pixel of the same image object of the basic image from the reference image according to each position offset (Step S1533); performing a noise removing procedure (Step S1534), for removing noise pixels of the same image object in the reference image with respect to the basic image; and overlaying the pixels with the pixels at the corresponding position in the basic image, so as to generate the output image (Step S1535).

In order to clearly demonstrate the operation flow of the image compensation procedure in this embodiment, the following example is used for illustration, in which the various settings are not limited to this embodiment herein. It is assumed that the safe shutter time is $\frac{1}{100}$ s, and the current shutter time is $\frac{1}{60}$ s. The current shutter time is two times greater than the safe shutter time, so it is set to shoot two digital images in the shutter time in this embodiment. The first image and the second image are respectively shot in the first time and the second time.

Figure 2:
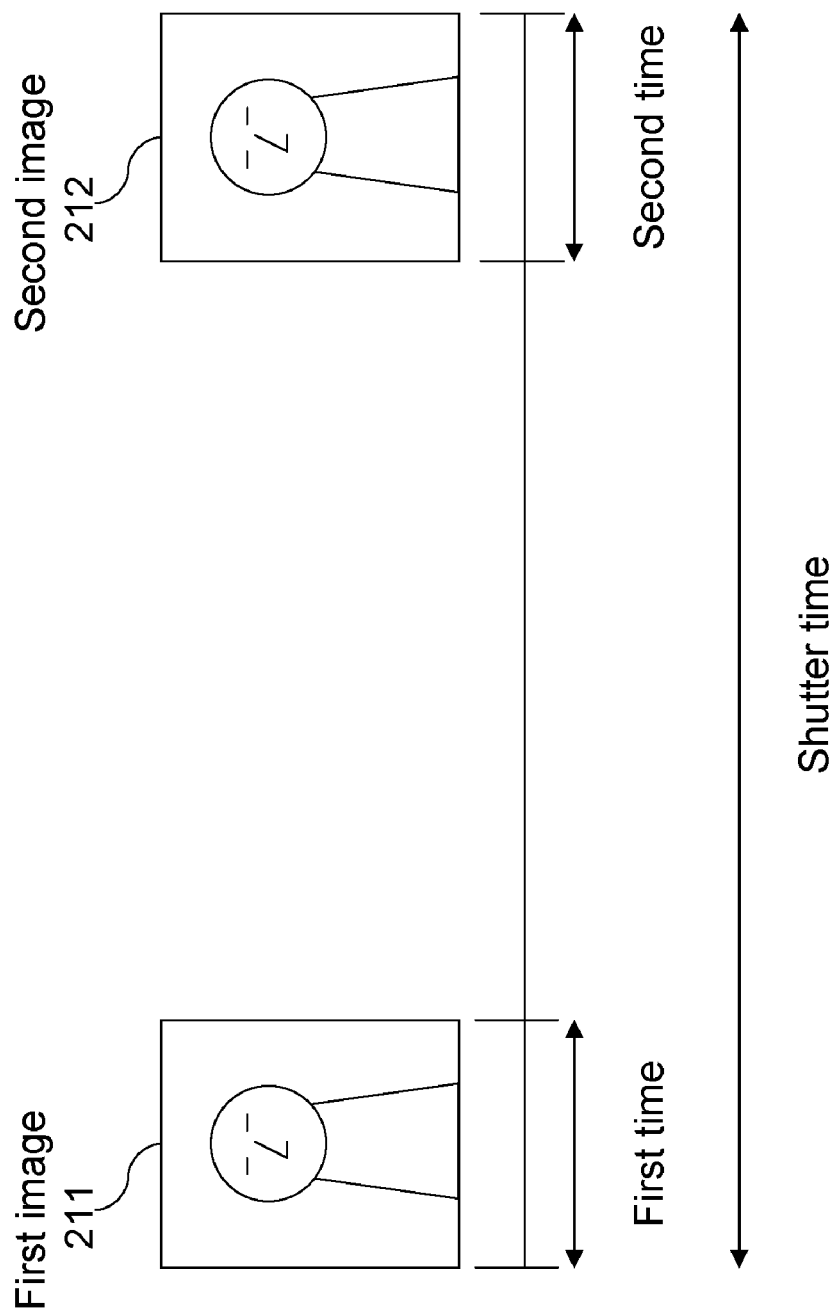
FIG. 2 is a schematic view of the time for shooting an image.

In addition, FIG. 2 is a schematic view of the time for shooting an image. For example, the shooting time of $\frac{1}{60}$ s as the original shutter time is further divided into the first time and the second time with the respective shutter time as $\frac{1}{120}$ s for shooting. The boundary blur detecting means is respectively performed on the first image and the second image, one of the two images is selected as the basic image, and the other one is selected as the reference image. The digital camera performs the boundary blur detecting means, for performing the area focusing means on the first image and the second image respectively (corresponding to Step S1521). Then, it is compared whether the boundary comparative values in the area focusing of the first image and the second image satisfy the boundary threshold or not (corresponding to Step S1522). The boundary comparative value refers to a boundary definition between image objects during focusing. The more distinctive the boundary between the image objects is, the higher the boundary comparative value is, and vice versa. The boundary comparative value is calculated according to the gap width for the boundary between the image objects. The boundary comparative value of the first image 211 is compared with that of the second image 212. If any one of the boundary comparative values of the first image and the second image is greater than the boundary threshold, the one with the greater boundary comparative value is selected as the basic image, and the other one with the smaller boundary comparative value is selected as the reference image (corresponding to Step S1523). If both the boundary comparative values of the first image and the second image are smaller than the boundary threshold, the first image and the second image are retrieved once again (corresponding to Step S1524).

The optical flow calculation procedure is performed on the reference image and the basic image, to find out a position offset of the pixel in the reference image with respect to that in the corresponding position of the basic image. The optical flow refers to the shift amount of the image object in the digital image among a plurality of different images. Due to the shaking generated during shooting, the same image object is not located at the same position in the reference image and the basic image. In this embodiment, the optical flow calculation is used to align each pixel of the same image in the reference image with that in the basic image.

FIG. 1e is a detailed flow chart of an operation of an optical flow calculating procedure, which further includes the following detailed steps: firstly, setting the first selecting window and the second selecting window, in which the first selecting window is used to select a part of the basic image, the second selecting window is used to select a part of the reference image, and the first selecting window is smaller than the second selecting window; and calculating a position offset of the pixel at the corresponding position of the first selecting window with respect to the second selecting window. Due to the shaking generated during the shooting process, the pixel position of the object in the basic image 311 does not fall at the pixel position the same as that in the reference image 312. Therefore, it intends to find out the position of the object in the reference image 312 the same as that in the basic image 311.

Figure 3:
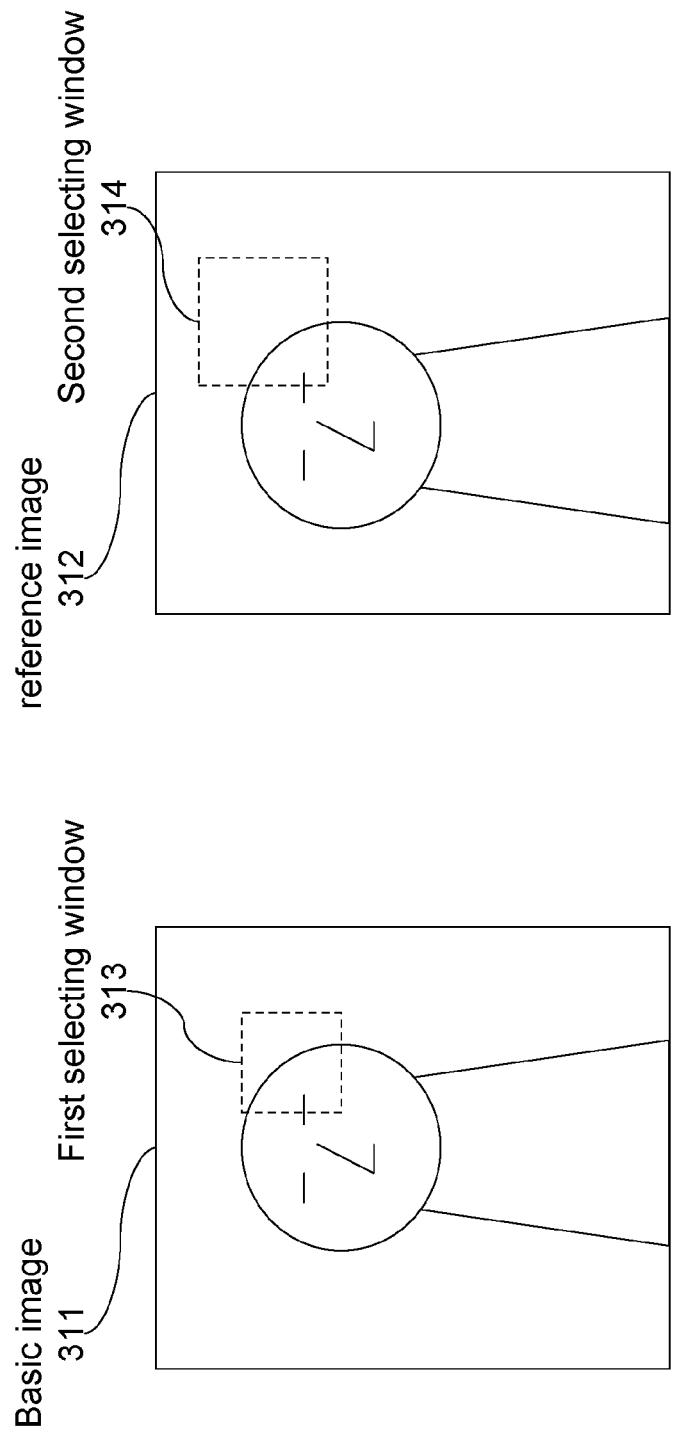
FIG. 3 is a schematic view of a selecting window with respect to an image.
Figure 4:
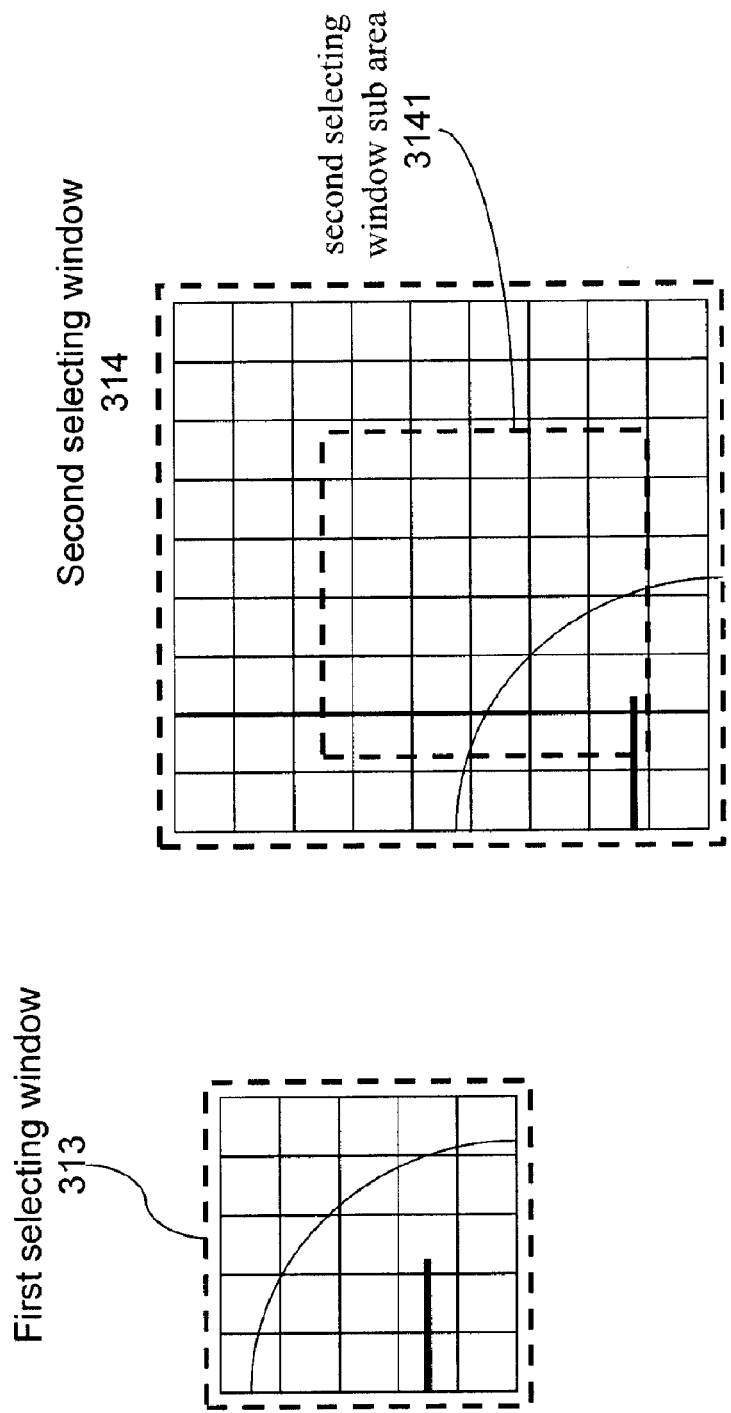
FIG. 4 is a schematic view of replacing a corresponding pixel with a position offset.

FIGS. 3a, 3b, and 4 are respectively schematic views of a selecting window with respect to an image and a schematic view of replacing a corresponding pixel with a position offset. In FIG. 3a, the first selecting window 313 is used to select a part of the image area in the basic image, and in FIG. 3a, the second selecting window 314 is used to select a part of the image area in the reference image.

The circling scope of the first selecting window 313 depends on the second selecting window 314. A second selecting window sub area 3141 is selected in the second selecting window 314, and the size of the second selecting window sub area 3141 is equal to the first selecting window 313. The second selecting window sub area 3141 respectively selects each area in the second selecting window 314 sequentially by means of overlaying. The first selecting window 313 selects areas from the second selecting window 314 from left to right and from top to bottom. The similarity between the second selecting window sub area 3141 and the first selecting window 313 is calculated through Equation 1, which shows the calculation of the similarity between the $(i,j)^{th}$ pixel of the first selecting window in the second selecting window and the adjacent pixels:

$$\text{Cost} = \sum_j \sum_i (w_{ij}^n \cdot w_{ij} \cdot \|I_1(x_{k+i}, y_{l+j}) - I_2(x_{m+i}, y_{n+j})\|). \quad \text{Equation 1}$$

The $(x_k, y_l)$ is a position of a pixel of the same image object in the reference image with respect to that of the basic image; $w_{ij}$ is a weight value of the $(i,j)^{th}$ pixel; $w_{ij}^n$ is a noise filter for the $(i,j)^{th}$ pixel; $I_1$ is the reference image; and $I_2$ is the basic image. The smaller the Cost value is, the higher the similarity of the two pixels is, and in other words, the more similar the two pixels are. It should be particularly noted that, in this embodiment, the pixel values of the noise pixels are adjusted by using the noise filter. Therefore, when the pixels are overlaid, the pixel distortion caused by directly overlaying the noise pixels with the original pixels can be avoided. When the $(x_k, y_l)^{th}$ pixel of the reference image (or the basic image) is a noise pixel, the $w_{ij}^n$ is set as 0, and otherwise, the $w_{ij}^n$ is set as 1.

For example, it is assumed that the first selecting window 313 is a 5*5 pixel array, and the second selecting window 314 is a 9*9 pixel array. The first selecting window 313 selects areas from the second selecting window 314 from left to right and from top to bottom. The pixels of the first selecting window 313 are compared with that of the second selecting window 314 one by one. In this embodiment, the similarity calculation needs to performed on the second selecting window 314 for 25 rounds, and 25 Cost values are obtained. The minimum Cost value is selected from 25 Cost values, and is considered as the pixel of the same image object of the second selecting window with respect to the first selecting window. Such step is repeated, so as to find out pixels at the other corresponding positions of the image object.

Figure 5:
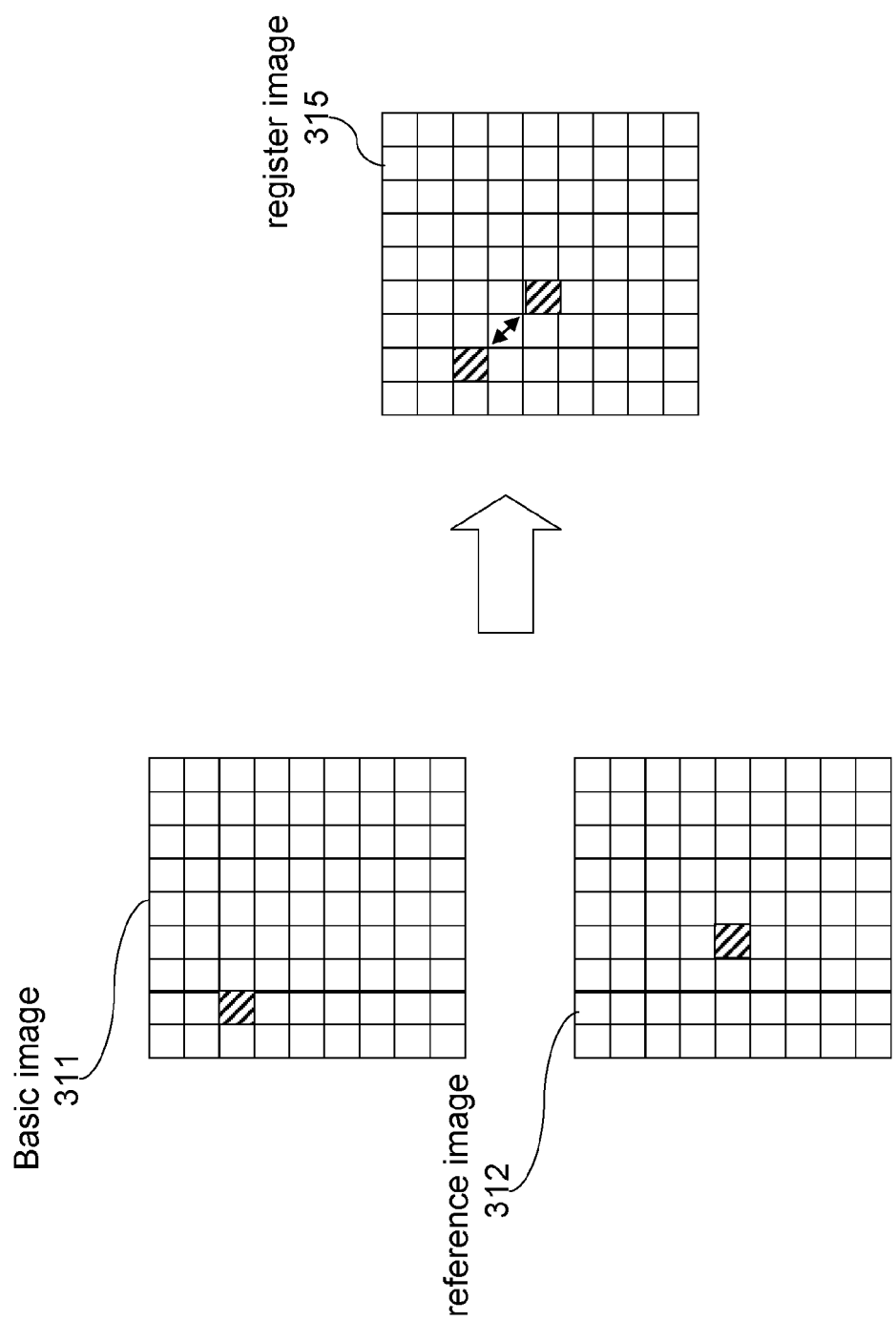
FIG. 5 is a schematic view of generating the position offset.

In this embodiment, the pixel position of the reference image 312 is corrected according to the position offset obtained through the optical flow calculation, so as to find out the corresponding pixel in the basic image 311. The same image pixel in the basic image 311 and that in the reference image 312 are represented by diagonal stripe squares. The right part of FIG. 4 represents the position of the same pixel in the basic image 311 and that in the reference image 312. Referring to FIG. 5, it is a schematic view of generating the position offset.

If the coordinates are used for demonstration, the position of the same pixel in the basic image 311 is (2, 3), and the position of the same pixel in the reference image 312 is (4, 5). The subtraction is performed on the pixel positions of the reference image 312 and the basic image 311, so as to obtain a relative position of the pixel in the reference image 312 with respect to the basic image 311, and the corrected value of the relative position there-between is (2, 2), which represents that the position of the corresponding pixel in the basic image 311 is obtained by subtracting the corrected value from the pixel of the reference image 312. Therefore, the corrected values of the relative positions of each reference image 312 with respect to the basic image 311 are respectively calculated, so as to find out the pixels in the basic image 311 according to the corrected values. Then, those resulted pixels are sequentially combined, so as to generate a register image 315. Referring to FIG. 6, it is a schematic view of generating a register image.

Finally, the pixels are overlaid with the pixels at the corresponding positions in the basic image to generate the output image. The pixels of the register image 315 are aligned with the corresponding pixels in the basic image 311, and then an image combining process is performed on the register image 315 and the basic image 311. During the image combing process, the pixels at the same position in the basic image 311 and that in the register image 315 are directly found out and overlaid with each other. The metadata stored in the RAW file may provide the brightness overlay compensation, so that a corresponding shutter time is obtained when the two images are overlaid. Finally, the two overlaid images are output as a clear output image.

The present invention provides a method for preventing a blurred image resulted from the shake during shooting. In the present invention, the similar area is retrieved from the successive and similar digital images to perform the image compensation on the noisy image, thereby generating a new composite image. The compensation is performed through using similar digital images, so as to improve the clearness and cleanness of the digital image.

What is claimed is:

1. A digital image processing method for correcting a shaking blur, suitable for correcting a blurred image caused by a shaking during shooting with a digital camera, comprising:
   obtaining a safe shutter time of the digital camera;
   performing an exposure adjustment procedure, for adjusting an aperture value and a ISO speed of the digital camera respectively, and obtaining a shutter time of the digital camera after being adjusted;
   performing a shooting procedure;
   shooting a plurality of digital images if the shutter time of the digital camera is greater than the safe shutter time; and
   performing an image compensation procedure,
   said image compensation procedure comprising:
   shooting a first image at a first time in the safe shutter time, and shooting a second image at a second time;
   performing a boundary blur detecting means on the first image and the second image respectively, and selecting one of the two images as a basic image and the other one as a reference image; and
   performing an optical flow calculating procedure, for aligning each pixel position of the same image object in the basic image with that of the reference image, and generating the output image.

2. The digital image processing method for correcting a shaking blur according to claim 1, wherein the boundary blur detecting means further comprises:
   performing an area focusing on the first image and the second image respectively;
   comparing whether boundary comparative values in the area focusing of the first image and the second image satisfy a boundary threshold or not;
   if any one of the boundary comparative values of the first image and the second image is greater than the boundary threshold, selecting the one with the greatest boundary comparative value as the basic image and the other one as the reference image; and
   if the boundary comparative values of both the first image and the second image are smaller than the boundary threshold, retrieving the first image and the second image once again.

3. The digital image processing method for correcting a shaking blur according to claim 1, wherein the step of performing the optical flow calculating procedure further comprises:
   finding out a position offset in the reference image with respect to a pixel position of the basic image;
   setting a first selecting window, for selecting a part of the basic image;
   setting a second selecting window, for selecting a part of the reference image, wherein the first selecting window is smaller than the second selecting window;
   calculating the position offset of a pixel in the first selecting window with respect to that in a corresponding position of the second selecting window;
   finding out each pixel of the same image object of the basic image from the reference image according to each position offset;
   performing a noise removing procedure, for removing noise pixels of the same image object in the reference image with respect to the basic image; and
   overlaying the pixels with that in corresponding positions of the basic image, so as to generate the output image.

4. The digital image processing method for correcting a shaking blur according to claim 1, wherein after the step of performing the shooting procedure, the method further comprises shooting a single digital image, if the shutter time of the digital camera is smaller than the safe shutter time.

* * * * *